(12) United States Patent
Lee et al.

(10) Patent No.: US 11,606,715 B2
(45) Date of Patent: Mar. 14, 2023

(54) METHOD OF TRANSMITTING BUFFER STATUS REPORT, AND DEVICE THEREFOR

(71) Applicant: LG ELECTRONICS INC., Seoul (KR)

(72) Inventors: Sunyoung Lee, Seoul (KR); Heejeong Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 17/264,778

(22) PCT Filed: Aug. 1, 2019

(86) PCT No.: PCT/KR2019/009615
§ 371 (c)(1),
(2) Date: Jan. 29, 2021

(87) PCT Pub. No.: WO2020/027602
PCT Pub. Date: Feb. 6, 2020

(65) Prior Publication Data
US 2021/0297895 A1    Sep. 23, 2021

(30) Foreign Application Priority Data

Aug. 2, 2018 (KR) ......................... 10-2018-0090517

(51) Int. Cl.
| | | |
|---|---|---|
| *H04W 28/02* | (2009.01) | |
| *H04W 72/0453* | (2023.01) | |
| *H04W 72/12* | (2023.01) | |
| *H04W 88/14* | (2009.01) | |

(52) U.S. Cl.
CPC ... *H04W 28/0278* (2013.01); *H04W 72/0453* (2013.01); *H04W 72/1284* (2013.01); *H04W 88/14* (2013.01)

(58) Field of Classification Search
None
See application file for complete search history.

(56) References Cited

U.S. PATENT DOCUMENTS

| | | | |
|---|---|---|---|
| 2015/0244429 A1* | 8/2015 | Zhang | H04W 72/042 370/329 |
| 2016/0205703 A1 | 7/2016 | Dudda et al. | |
| 2017/0245245 A1 | 8/2017 | Kim et al. | |
| 2020/0008218 A1* | 1/2020 | Shih | H04W 72/1205 |

FOREIGN PATENT DOCUMENTS

CN        107466068        12/2017

OTHER PUBLICATIONS

PCT International Application No. PCT/KR2019/009615, International Search Report dated Nov. 7, 2019, 10 pages.
Intel Corporation, "UL Support for LWA," R2-163572, 3GPP TSG-RAN2 Meeting #94, May 2016, 6 pages.
Catt, "BSR MAC CE," R2-1710298, 3GPP TSG-RAN WG2 #99bis, Oct. 2017, 9 pages.

* cited by examiner

*Primary Examiner* — Kouroush Mohebbi
(74) *Attorney, Agent, or Firm* — Lee Hong Degerman Kang Waimey

(57) ABSTRACT

In the present disclosure, a first node performs buffer status reporting including information regarding a total amount of UL data. The first node determines the total amount of UL data for the buffer status reporting based on an amount of UL data for which the UL resources are actually allocated to the second node by the first node.

6 Claims, 12 Drawing Sheets

(a) User Plane Protocol Stack (b) Control Plane Protocol Stack

METHOD OF TRANSMITTING BUFFER STATUS REPORT, AND DEVICE THEREFOR

CROSS-REFERENCE TO RELATED APPLICATIONS

This application is the National Stage filing under 35 U.S.C. 371 of International Application No. PCT/KR2019/009615, filed on Aug. 1, 2019, which claims the benefit of KR Application No. 10-2018-0090517, filed on Aug. 2, 2018, the contents of which is hereby incorporated by reference herein in its entirety.

TECHNICAL FIELD

The present invention relates to a wireless communication system.

BACKGROUND ART

Introduction of new radio communication technologies has led to increases in the number of user equipments (UEs) to which a base station (BS) provides services in a prescribed resource region, and has also led to increases in the amount of data and control information that the BS transmits to the UEs. Due to typically limited resources available to the BS for communication with the UE(s), new techniques are needed by which the BS utilizes the limited radio resources to efficiently receive/transmit uplink/downlink data and/or uplink/downlink control information.

DISCLOSURE

Technical Problem

Various types of signals, including data signals and control signals, are communicated via the UL and DL. Scheduling of such communications is typically performed, to achieve improved efficiency, latency, and/or reliability. Overcoming delay or latency has become an important challenge in applications whose performance critically depends on delay/latency.

The technical objects that can be achieved through the present invention are not limited to what has been particularly described hereinabove and other technical objects not described herein will be more clearly understood by persons skilled in the art from the following detailed description.

Technical Solution

As an aspect of the present disclosure, provided herein is a method for performing buffer status reporting by a first node in a wireless communication system. The method comprises: allocating UL resources to a second node; and transmitting a buffer status report to a third node. The buffer status report includes information on a total amount of UL data. The total amount of UL data is determined based on an amount of UL data for which the UL resources are allocated by the first node.

As another aspect of the present disclosure, provided herein is a device for a first node of performing buffer status reporting in a wireless communication system. The device comprises at least one processor; and at least one computer memory that is operably connectable to the at least one processor and that has stored thereon instructions which, when executed, cause the at least one processor to perform operations. The operations comprises: allocating UL resources to a second node; and transmitting a buffer status report to a third node. The buffer status report includes information on a total amount of UL data. The total amount of UL data is determined based on an amount of UL data for which the UL resources are allocated by the first node.

In each aspect of the present disclosure, the total amount of UL data may not include an amount of UL data for which the UL resources are not allocated by the first node.

In each aspect of the present disclosure, the method or operations may further comprise: receiving configuration information on a time duration. The total amount of UL data may include an amount of UL data for which the UL resources are allocated for the time duration by the first node In each aspect of the present disclosure, the method or operations may further comprise: receiving a buffer status report including information on an amount of data available for transmission at the second node.

In each aspect of the present disclosure, the method or operations may further comprise: transmitting information on the UL resources allocated to the second node.

In each aspect of the present disclosure, an amount of the UL resources allocated to the second node may be equal to or less than an amount of UL resources for the amount of data available for transmission at the second node.

In each aspect of the present disclosure, the total amount of UL data may further include an amount of UL data available at the first node.

In each aspect of the present disclosure, the second node may be an autonomous vehicle that communicates with at least a mobile terminal, a network, and another autonomous vehicle other than that node.

The above technical solutions are merely some parts of the implementations of the present disclosure and various implementations into which the technical features of the present disclosure are incorporated can be derived and understood by persons skilled in the art from the following detailed description of the present disclosure.

Advantageous Effects

In some scenarios, implementations of the present disclosure may provide one or more of the following advantages. In some scenarios, radio communication signals can be more efficiently transmitted and/or received. Therefore, overall throughput of a radio communication system can be improved.

According to some implementations of the present disclosure, delay/latency occurring during communication between a user equipment and a BS may be reduced.

Also, signals in a new radio access technology system can be transmitted and/or received more effectively.

It will be appreciated by persons skilled in the art that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
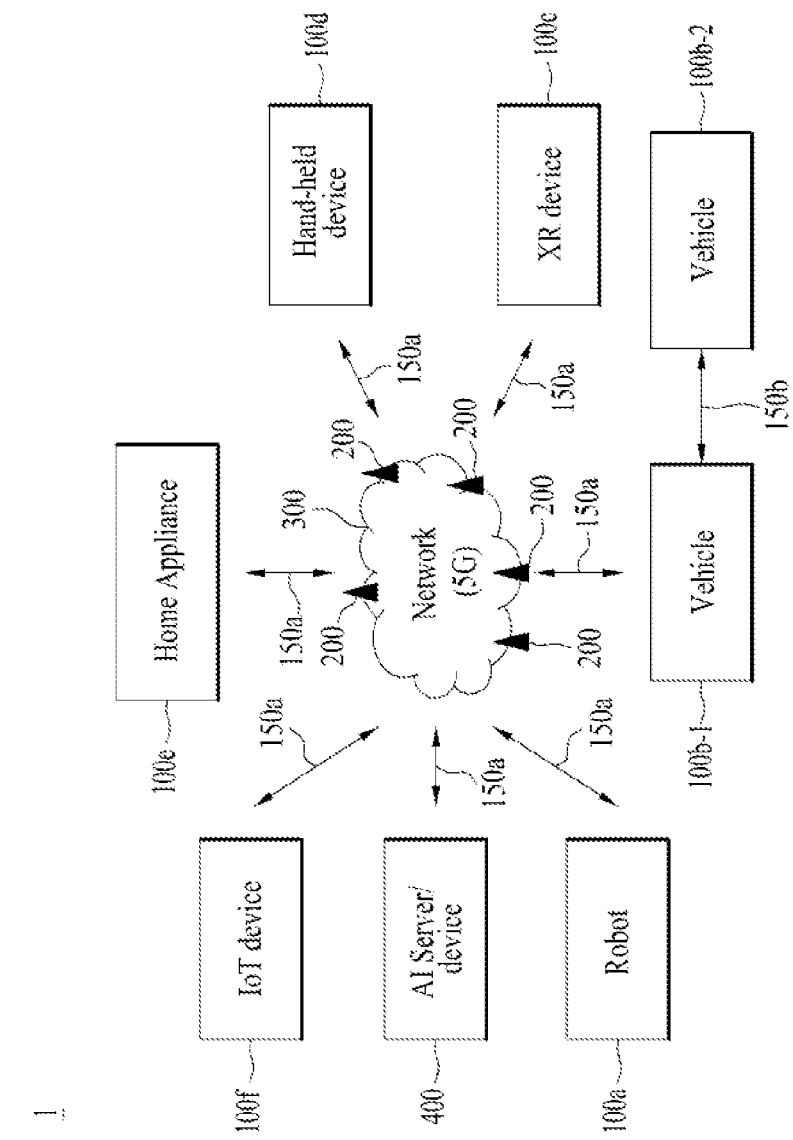
FIG. 1 illustrates an example of a communication system 1 to which implementations of the present disclosure is applied.

Reference will now be made in detail to the exemplary implementations of the present disclosure, examples of which are illustrated in the accompanying drawings. The detailed description, which will be given below with reference to the accompanying drawings, is intended to explain exemplary implementations of the present disclosure, rather than to show the only implementations that can be implemented according to the disclosure. The following detailed description includes specific details in order to provide a thorough understanding of the present disclosure. However, it will be apparent to those skilled in the art that the present disclosure may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced. For example, the following documents may be referenced.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol 3GPP NR (e.g. 5G)
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: Overall description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description In the present disclosure, a user equipment (UE) may be a fixed or mobile device. Examples of the UE include various devices that transmit and receive user data and/or various kinds of control information to and from a base station (BS). In the present disclosure, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the enhanced packet core (EPC)/long term evolution (LTE) system is referred to as an eNB, and a BS of the new radio (NR) system is referred to as a gNB.

In the present disclosure, a node refers to a point capable of transmitting/receiving a radio signal through communication with a UE. Various types of BSs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be a BS. For example, the node may be a radio remote head (RRH) or a radio remote unit (RRU). The RRH or RRU generally has a lower power level than a power level of a BS. Since the RRH or RRU (hereinafter, RRH/RRU) is generally connected to the BS through a dedicated line such as an optical cable, cooperative communication between RRH/RRU and the BS can be smoothly performed in comparison with cooperative communication between BSs connected by a radio line. At least one antenna is installed per node. The antenna may include a physical antenna or an antenna port or a virtual antenna.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and an uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In the present disclosure, a physical downlink control channel (PDCCH), and a physical downlink shared channel (PDSCH) refer to a set of time-frequency resources or resource elements (REs) carrying downlink control information (DCI), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. In the present disclosure, for dual connectivity (DC) operation, the term "special Cell" refers to the PCell of the master cell group (MCG) or the PSCell of the secondary cell group (SCG), and otherwise the term Special Cell refers to the PCell. An SpCell supports physical uplink control channel (PUCCH) transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with DC. For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells.

The MCG is a group of serving cells associated with a master BS which terminates at least S1-MME, and the SCG is a group of serving cells associated with a secondary BS that is providing additional radio resources for the UE but is not the master BS. The SCG includes a primary SCell (PSCell) and optionally one or more SCells. In DC, two MAC entities are configured in the UE: one for the MCG and one for the SCG. Each MAC entity is configured by RRC with a serving cell supporting PUCCH transmission and contention based Random Access. In the present disclosure, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present disclosure, monitoring a channel refers to attempting to decode the channel. For example, monitoring a physical downlink control channel (PDCCH) refers to attempting to decode PDCCH(s) (or PDCCH candidates).

In the present disclosure, "C-RNTI" refers to a cell RNTI, "SI-RNTI" refers to a system information RNTI, "P-RNTI" refers to a paging RNTI, "RA-RNTI" refers to a random access RNTI, "SC-RNTI" refers to a single cell RNTI", "SL-RNTI" refers to a sidelink RNTI, "SPS C-RNTI" refers to a semi-persistent scheduling C-RNTI, and "CS-RNTI" refers to a configured scheduling RNTI.

FIG. 1 illustrates an example of a communication system 1 to which implementations of the present disclosure is applied.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g. e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices, base stations (BSs), and a network. Although FIG. 1 illustrates a 5G network as an example of the network of the communication system 1, the implementations of the present disclosure are not limited to the 5G system, and can be applied to the future communication system beyond the 5G system.

The BSs and the network may be implemented as wireless devices and a specific wireless device 200a may operate as a BS/network node with respect to other wireless devices.

The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A user equipment (UE) may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field. The unmanned aerial vehicle (UAV) may be, for example, an aircraft aviated by a wireless control signal without a human being onboard. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sales (POS) system. The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3 G network, a 4 G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RATs (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
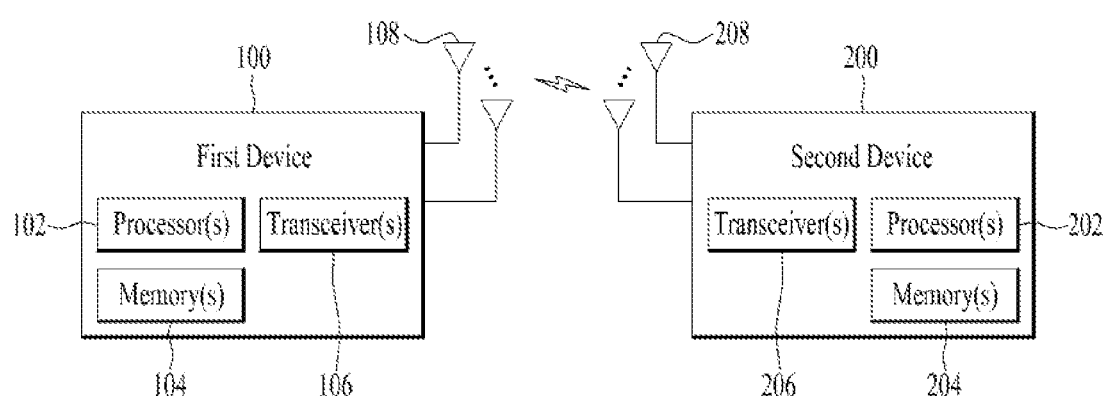
FIG. 2 is a block diagram illustrating examples of communication devices which can perform a method according to the present disclosure.

FIG. 2 is a block diagram illustrating examples of communication devices which can perform a method according to the present disclosure.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to {the wireless device 100a to 100f and the BS 200} and/or {the wireless device 100a to 100f and the wireless device 100a to 100f} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the functions, procedures, and/or methods described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the procedures and/or methods described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the functions, procedures, and/or methods described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the procedures and/or methods described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The functions, procedures, proposals, and/or methods disclosed in the present disclosure may be implemented using firmware or software and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS, unless otherwise mentioned or described. For example, the processor(s) 102 connected to, mounted on or launched in the first wireless device 100 may be configured to perform the UE behaviour according to an implementation of the present disclosure or control the transceiver(s) 106 to perform the UE behaviour according to an implementation of the present disclosure. The processor(s) 202 connected to, mounted on or launched in the second wireless device 200 may be configured to perform the BS behaviour according to an implementation of the present disclosure or control the transceiver(s) 206 to perform the BS behaviour according to an implementation of the present disclosure.

Figure 3:
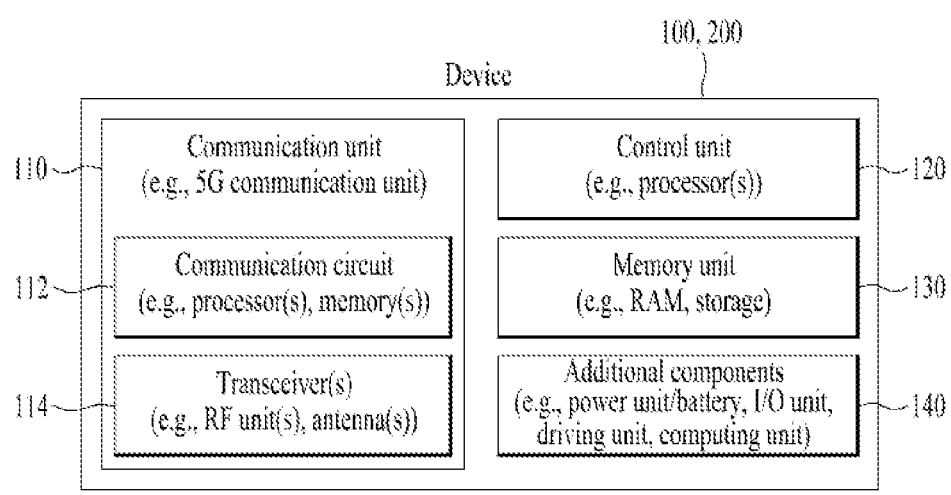
FIG. 3 illustrates another example of a wireless device which can perform implementations of the present invention.

FIG. 3 illustrates another example of a wireless device which can perform implementations of the present invention. The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit (e.g. audio I/O port, video I/O port), a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a Fintech device (or a finance device), a security device, a climate/environment device, the AI server/device (400 of FIG. 1), the BSs (200 of FIG. 1), a network node, etc. The wireless device may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 4:
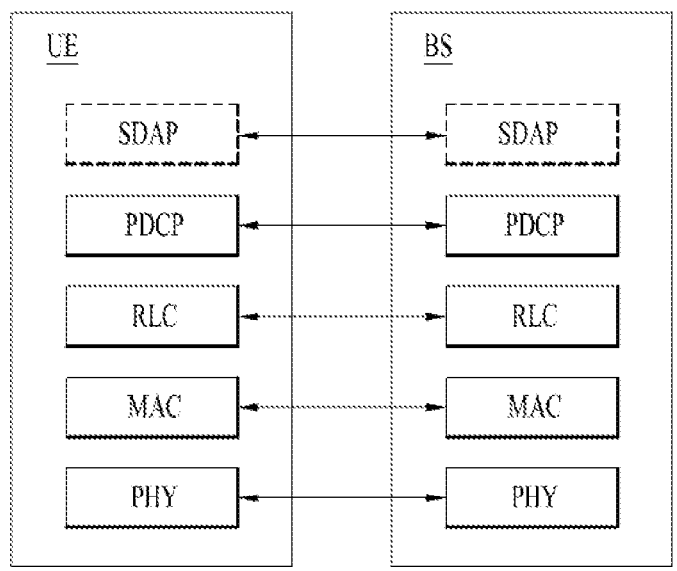
FIG. 4 illustrates an example of protocol stacks in a third generation partnership project (3GPP) based wireless communication system.
Figure 4:
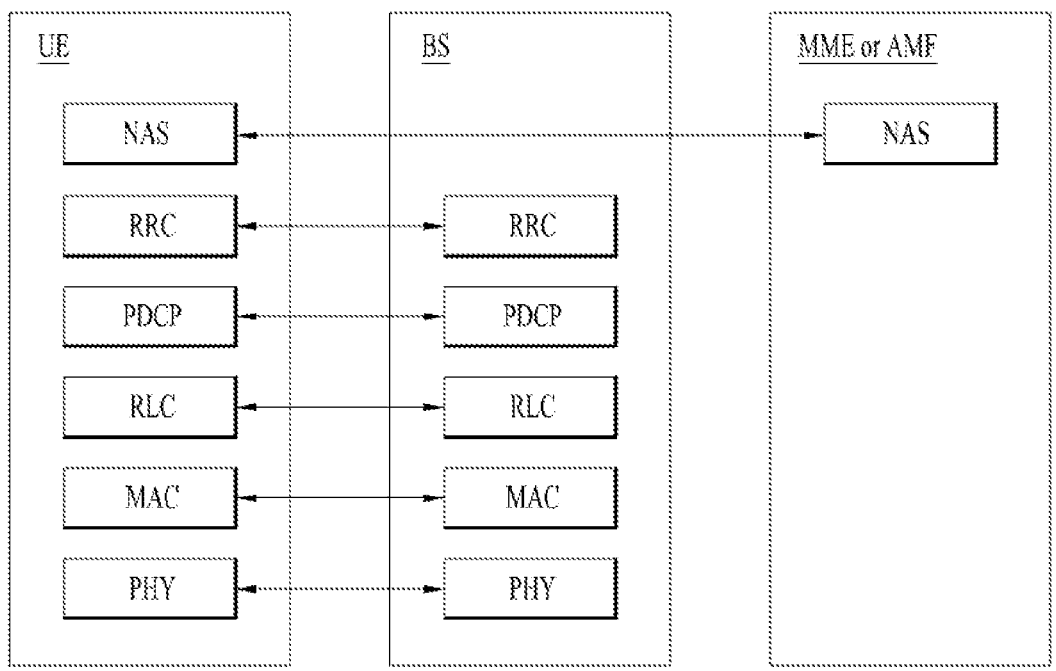

FIG. 4 illustrates an example of protocol stacks in a 3GPP based wireless communication system.

In particular, FIG. 4(a) illustrates an example of a radio interface user plane protocol stack between a UE and a base station (BS) and FIG. 4(b) illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 4(a), the user plane protocol stack may be divided into a first layer (Layer 1) (i.e., a physical (PHY) layer) and a second layer (Layer 2). Referring to FIG. 4(b), the control plane protocol stack may be divided into Layer 1 (i.e., a PHY layer), Layer 2, Layer 3 (e.g., a radio resource control (RRC) layer), and a non-access stratum (NAS) layer. Layer 1, Layer 2 and Layer 3 are referred to as an access stratum (AS).

The NAS control protocol is terminated in an access management function (AMF) on the network side, and performs functions such as authentication, mobility management, security control and etc.

In the 3GPP LTE system, the layer 2 is split into the following sublayers: medium access control (MAC), radio link control (RLC), and packet data convergence protocol (PDCP). In the 3GPP New Radio (NR) system, the layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G Core Network quality of service (QoS) flows.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G core (5GC) or NG-RAN; establishment, maintenance and release of an RRC connection between the UE and NG-RAN; security functions including key management; establishment, configuration, maintenance and release of signalling radio bearers (SRBs) and data radio bearers (DRBs); mobility functions (including: handover and context transfer; UE cell selection and reselection and control of cell selection and reselection; Inter-RAT mobility); QoS management functions; UE measurement reporting and control of the reporting; detection of and recovery from radio link failure; NAS message transfer to/from NAS from/to UE.

In the 3GPP NR system, the main services and functions of the PDCP sublayer for the user plane include: sequence numbering; header compression and decompression: ROHC only; transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

The RLC sublayer supports three transmission modes: Transparent Mode (TM); Unacknowledged Mode (UM); and Acknowledged Mode (AM). The RLC configuration is per logical channel with no dependency on numerologies and/or transmission durations. In the 3GPP NR system, the main services and functions of the RLC sublayer depend on the transmission mode and include: Transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the MAC sublayer include: mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use. Different kinds of data transfer services are offered by MAC. To accommodate different kinds of data transfer services, multiple types of logical channels are defined i.e. each supporting transfer of a particular type of information. Each logical channel type is defined by what type of information is transferred. Logical channels are classified into two groups: Control Channels and Traffic Channels. Control channels are used for the transfer of control plane information only, and traffic channels are used for the transfer of user plane information only. Broadcast Control Channel (BCCH) is a downlink logical channel for broadcasting system control information, paging Control Channel (PCCH) is a downlink logical channel that transfers paging information, system information change notifications and indications of ongoing PWS broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In Downlink, the following connections between logical channels and transport channels exist: BCCH can be mapped to BCH; BCCH can be mapped to downlink shared channel (DL-SCH); PCCH can be mapped to PCH; CCCH can be mapped to DL-SCH; DCCH can be mapped to DL-SCH; and DTCH can be mapped to DL-SCH. In Uplink, the following connections between logical channels and transport channels exist: CCCH can be mapped to uplink shared channel (UL-SCH); DCCH can be mapped to UL-SCH; and DTCH can be mapped to UL-SCH.

Figure 5:
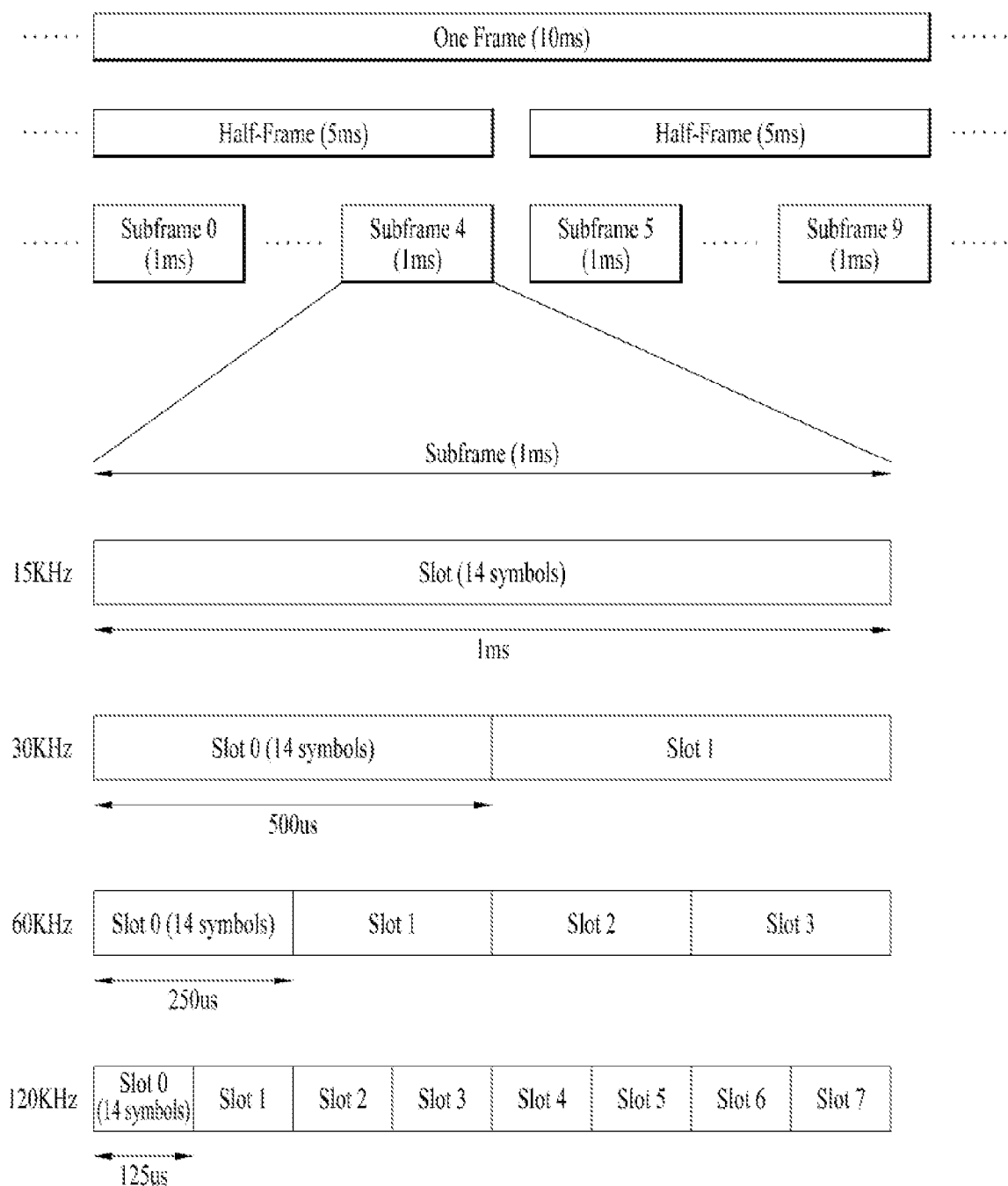
FIG. 5 illustrates an example of a frame structure in a 3GPP based wireless communication system.

FIG. 5 illustrates an example of a frame structure in a 3GPP based wireless communication system.

The frame structure illustrated in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz. The following table shows the number of OFDM symbols per slot, the number of slots per frame, and the number of slots per for the normal CP, according to the subcarrier spacing $\Delta f = 2^u * 15$ kHz.

TABLE 1

| u | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2^u * 15$ kHz.

TABLE 2

| u | $N_{symb}^{slot}$ | $N_{slot}^{frame,u}$ | $N_{slot}^{subframe,u}$ |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g. radio resource control (RRC) signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g. RRC parameter).

Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

Figure 6:
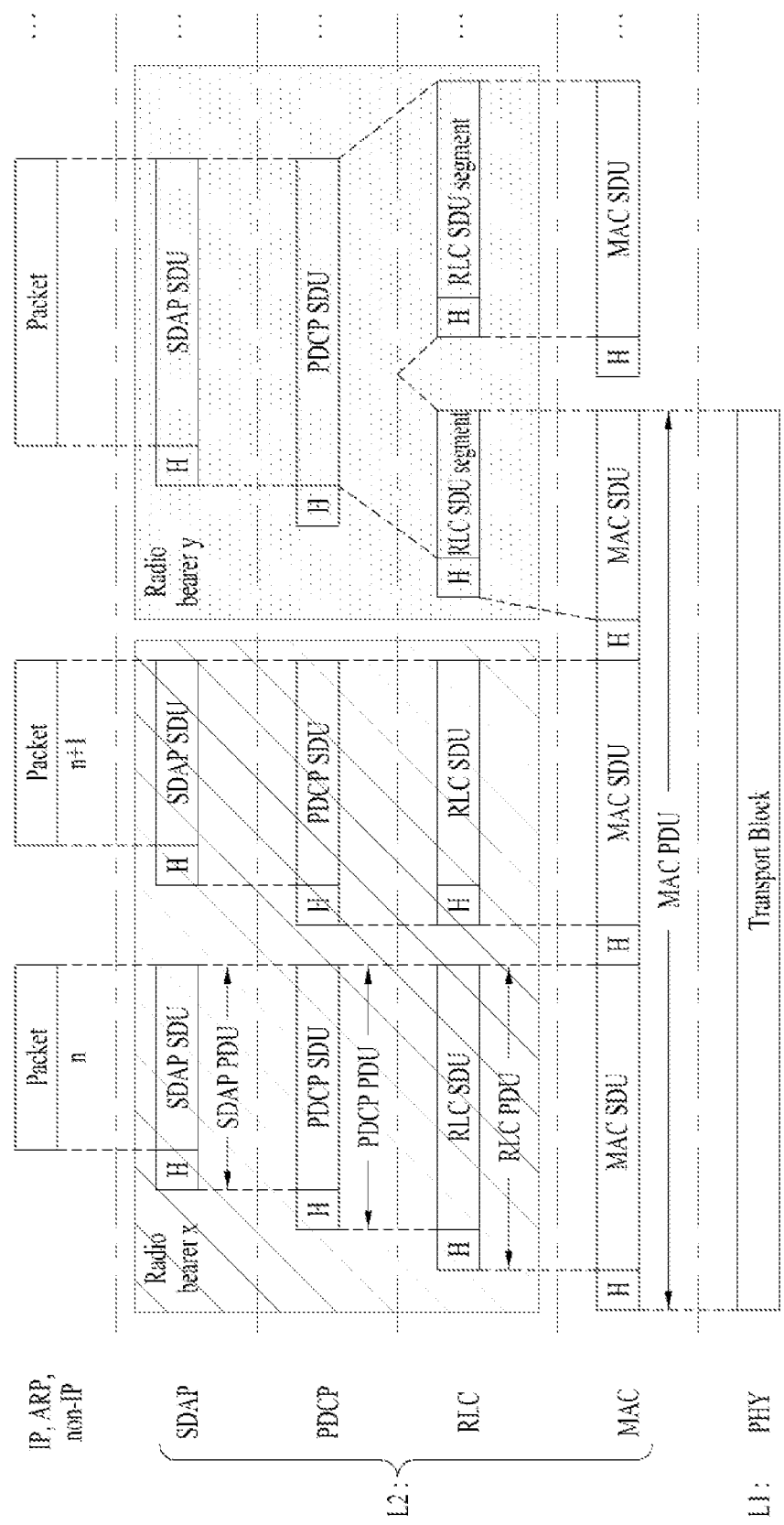
FIG. 6 illustrates a data flow example in the 3GPP new radio (NR) system.

FIG. 6 illustrates a data flow example in the 3GPP NR system.

In FIG. 6, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to physical uplink shared channel (PUSCH) and physical random access channel (PRACH), respectively, and the downlink transport channels DL-SCH, BCH and PCH are mapped to physical downlink shared channel (PDSCH), physical broad cast channel (PBCH) and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

In order to transmit data on UL-SCH, a UE shall have uplink resources available to the UE. In order to receive data on DL-SCH, a UE shall have downlink resources available to the UE. The resource allocation includes time domain resource allocation and frequency domain resource allocation. In the present disclosure, uplink resource allocation is also referred to as uplink grant, and downlink resource allocation is also referred to as downlink assignment. An uplink grant is either received by the UE dynamically on PDCCH, in a Random Access Response, or configured to the UE semi-persistently by RRC. Downlink assignment is either received by the UE dynamically on the PDCCH, or configured to the UE semi-persistently by RRC signaling from the BS. In particular, a UL grant that is configured semi-persistently and DL assignment that is configured semi-persistently are referred to as a configured UL grant and a configured DL assignment, respectively.

The millimeter wave (mmWave) bands have been studied as a means to support the extreme data rate demands of the 5G system. The ultra-dense BS deployment is required in order to overcome the high propagation loss occurring at the mmWave and to guarantee line-of-site (LOS) links at any given time. Providing wired backhaul to each BS in such a dense BS deployment will require significantly high cost for the network operators. Recently, an integrated access and backhaul (IAB) is being investigated as a means to overcome development costs of ultra-dense 5G millimeter wave (mmWave) networks by realizing wireless backhaul links to relay the access traffic. In the IAB networks, some of BSs have traditional fiber-like backhaul capabilities, and the rest of BSs are connected to the fiber infrastructures wirelessly, possibly through multiple hops. The IAB networks may reduce deployment costs by obviating the need to provide the wired backhaul to each BS.

Figure 7:
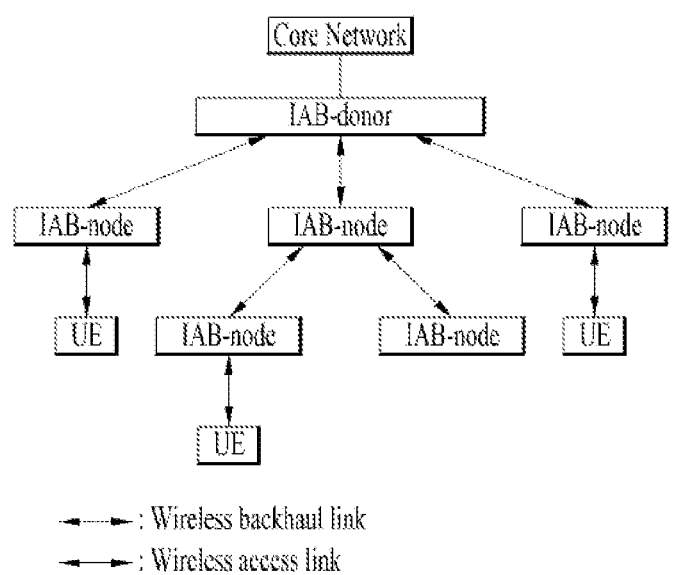
FIG. 7 illustrates an example of a reference diagram for integrated access and backhaul (IAB) architectures.

FIG. 7 illustrates an example of a reference diagram for IAB-architectures.

In the present disclosure, an IAB-node denotes a radio access network (RAN) node that supports wireless access to UEs and wirelessly backhauls the access traffic, and an IAB-donor denotes a RAN node which provides UE's interface to core network (e.g. EPC, 5GC) and wireless backhauling functionality to IAB-nodes. Each IAB-node connects as a UE to the core network (CN). In some scenarios, an IAB-node may connect as a UE to EPC using evolved universal terrestrial radio access (E-UTRA)-new radio (NR) dual connectivity (EN-DC). In some scenarios, an IAB-node may connect as a UE to 5GC using the new radio (NR). A transmission and reception point (TRP) with IAB functionalities may act as an IAB-node. An IAB-donor may be a BS with a wired connection to the CN.

In the IAB network, an IAB node closer to the CN could be a scheduler for another IAB node or UE that connects as a UE to the IAB node wirelessly. In the present disclosure, an IAB-node that schedules wireless transmission/reception for another IAB-node or UE is referred to as a parent node, and an IAB-node or UE for which wireless transmission/reception is scheduled by another node is referred to as a child node. For example, a UE of which transmission/reception is scheduled by a BS may be a child node of the BS, and the BS may be a parent node of the UE.

In the IAB network, downlink IAB node transmissions (i.e. transmissions on backhaul links from an IAB-node to child IAB-nodes served by the IAB-node and transmissions on access links from an IAB-node to UEs served by the IAB-node) are scheduled by the IAB-node itself. Uplink IAB transmission (i.e. transmissions on a backhaul link from an IAB-node to its parent IAB-node or IAB-donor) is scheduled by the parent IAB-node or IAB-donor.

For uplink transmission by a UE to a BS, a scheduling request (SR) is used for requesting UL-SCH resources for new transmission, and a buffer status reporting (BSR) procedure is used to provide the serving BS with information about UL volume in the MAC entity. For example, in a UE, the SR and the BSR procedure may be configured and performed as follows.

The MAC entity of the UE may be configured with zero, one, or more SR configurations. An SR configuration consists of a set of PUCCH resources for SR across different BWPs and cells. For a logical channel, at most one PUCCH resource for SR is configured per BWP by RRC signaling from the BS. Each SR configuration corresponds to one or more logical channels. Each logical channel may be mapped to zero or one SR configuration, which is configured by the BS through RRC signaling. The SR configuration of the logical channel that triggered the BSR (if such a configuration exists) is considered as a corresponding SR configuration for the triggered SR. The network (e.g. BS) configures, to the UE through RRC signaling, the following parameters for the SR procedure: sr-ProhibitTimer (per SR configuration); sr-TransMax (per SR configuration). The following UE variables are used for the scheduling request procedure: SR_COUNTER (per SR configuration).

If an SR is triggered and there are no other SRs pending corresponding to the same SR configuration, the MAC entity sets the SR_COUNTER of the corresponding SR configuration to 0. When an SR is triggered, it is considered as pending until it is cancelled. All pending SR(s) triggered prior to the MAC PDU assembly shall be cancelled and each respective sr-ProhibitTimer is stopped when the MAC PDU is transmitted and this PDU includes a BSR MAC control element (CE) which contains buffer status up to (and including) the last event that triggered a BSR prior to the MAC PDU assembly. All pending SR(s) is(are) cancelled when the UL grant(s) can accommodate all pending data available for transmission. Only PUCCH resources on a BWP which is active at the time of SR transmission occasion are considered valid. As long as at least one SR is pending, the MAC entity shall for each pending SR:

1> if the MAC entity has no valid PUCCH resource configured for the pending SR:
2>> initiate a random Access procedure on the SpCell and cancel the pending SR.
1> else, for the SR configuration corresponding to the pending SR:
2>> when the MAC entity has an SR transmission occasion on the valid PUCCH resource for SR configured; and
2>> if sr-ProhibitTimer is not running at the time of the SR transmission occasion; and
2>> if the PUCCH resource for the SR transmission occasion does not overlap with a measurement gap; and
2>> if the PUCCH resource for the SR transmission occasion does not overlap with a UL-SCH resource:
3>>> if SR_COUNTER<sr-TransMax:
4>>>> increment SR_COUNTER by 1;
4>>>> instruct the physical layer to signal the SR on one valid PUCCH resource for SR;
4>>>> start the sr-ProhibitTimer.
3>>> else:
4>>>> notify RRC to release PUCCH for all Serving Cells;
4>>>> notify RRC to release SRS for all Serving Cells;
4>>>> clear any configured downlink assignments and uplink grants;
4>>>> initiate a random access procedure on the SpCell and cancel all pending SRs.

The network (e.g. BS) configures, to a UE through RRC signaling, the following parameters to control the buffer status reporting (BSR): periodicBSR-Timer; retxBSR-Timer; logicalChannelSR-DelayTimerApplied; logicalChannelSR-DelayTimer; logicalChannelSR-Mask; logicalChannelGroup. Each logical channel may be allocated to an LCG using the logicalChannelGroup. The MAC entity of the UE determines the amount of UL data available for a logical channel according to the data volume calculation procedure in RLC and PDCP. A BSR is triggered if any of the following events occur:

the MAC entity has new UL data available for a logical channel which belongs to an LCG; and either i) the new UL data belongs to a logical channel with higher priority than the priority of any logical channel containing available UL data which belong to any LCG; or
ii) none of the logical channels which belong to an LCG contains any available UL data, in which case the BSR is referred to as 'Regular BSR';

UL resources are allocated and number of padding bits is equal to or larger than the size of the Buffer Status Report MAC CE plus its subheader, in which case the BSR is referred to as 'Padding BSR';

retxBSR-Timer expires, and at least one of the logical channels which belong to an LCG contains UL data, in which case the BSR is referred to as 'Regular BSR';

periodicBSR-Timer expires, in which case the BSR is referred to as 'Periodic BSR'.

For Regular BSR, the MAC entity shall:

1> if the BSR is triggered for a logical channel for which logicalChannelSR-DelayTimerApplied is configured by upper layers:
  2>> start or restart the logicalChannelSR-DelayTimer.
1> else:
  2>> if running, stop the logicalChannelSR-DelayTimer.

For Regular and Periodic BSR, the MAC entity shall:

1> if more than one LCG has data available for transmission when the MAC PDU containing the BSR is to be built:
  2>> report Long BSR for all LCGs which have data available for transmission.
1> else:
  2>> report Short BSR.

For Padding BSR:

1> if the number of padding bits is equal to or larger than the size of the Short BSR plus its subheader but smaller than the size of the Long BSR plus its subheader:
  2>> if more than one LCG has data available for transmission when the BSR is to be built:
    3>>> if the number of padding bits is equal to the size of the Short BSR plus its subheader:
      4>>>> report Short Truncated BSR of the LCG with the highest priority logical channel with data available for transmission.
    3>>> else:
      4>>>> report Long Truncated BSR of the LCG(s) with the logical channels having data available for transmission following a decreasing order of priority, and in case of equal priority, in increasing order of LCGID.
  2>> else:
    3>>> report Short BSR.
1> else if the number of padding bits is equal to or larger than the size of the Long BSR plus its subheader:
  2>> report Long BSR for all LCGs which have data available for transmission.

For BSR triggered by retxBSR-Timer expiry, the MAC entity considers that the logical channel that triggered the BSR is the highest priority logical channel that has data available for transmission at the time the BSR is triggered. The MAC entity shall:

1> if the Buffer Status reporting procedure determines that at least one BSR has been triggered and not cancelled:
  2>> if UL-SCH resources are available for a new transmission:
    3>>> instruct the Multiplexing and Assembly procedure to generate the BSR MAC CE(s);
    3>>> start or restart periodicBSR-Timer except when all the generated BSRs are long or short Truncated BSRs;
    3>>> start or restart retxBSR-Timer.
  2>> if a Regular BSR has been triggered and logicalChannelSR-DelayTimer is not running:
    3>>> if there is no UL-SCH resource available for a new transmission; or
    3>>> if the MAC entity is configured with configured uplink grant(s) and the Regular BSR was not triggered for a logical channel for which logical channel SR masking (logicalChannelSR-Mask) is setup by upper layers; or
    3>>> if the UL-SCH resources available for a new transmission do not meet the LCP mapping restrictions configured for the logical channel(s) that triggered the BSR(s):
      4>>>> trigger a Scheduling Request.

A MAC PDU contains at most one BSR MAC CE, even when multiple events have triggered a BSR. All triggered BSRs may be cancelled when the UL grant(s) can accommodate all pending data available for transmission but is not sufficient to additionally accommodate the BSR MAC CE plus its subheader. All BSRs triggered prior to MAC PDU assembly shall be cancelled when a MAC PDU which includes a BSR MAC CE is transmitted.

As mentioned before, each IAB node would schedule its childe node(s) by itself. Basically, UL scheduling in IAB is to be performed based on SR/BSR and UL resource allocation between the scheduling and scheduled nodes. Given that one node could play roles of scheduling node and scheduled nodes in parallel, UL resource scheduling in IAB needs to consider the fact that a node would request an UL resource for data/information which is to be received by that node.

Figure 8:
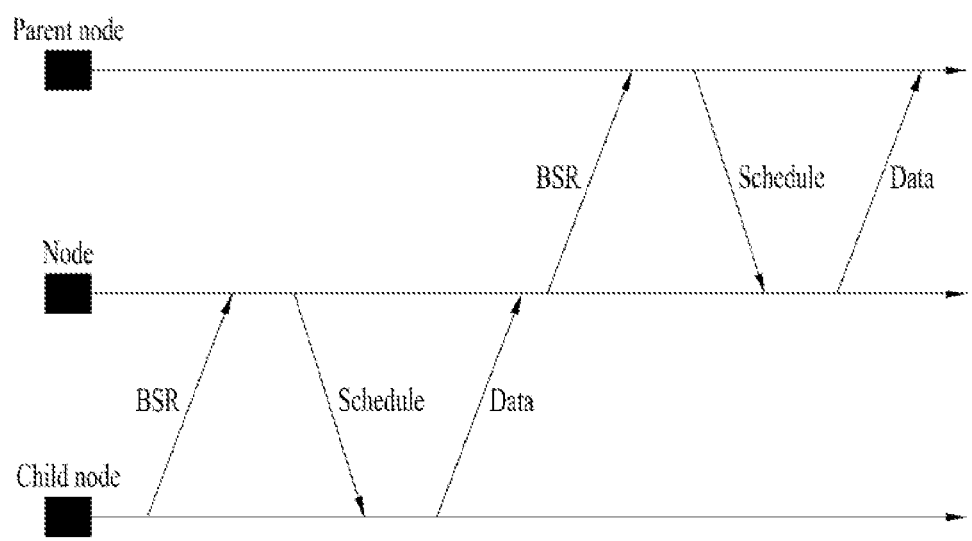
FIG. 8 illustrates an example of UL scheduling in IAB scenarios.

FIG. 8 illustrates an example of UL scheduling in IAB scenarios.

One straight forward way of UL scheduling in IAB would be that, a node requests UL resource to its parent node when UL data is received from its child node as shown in the example of FIG. 8. In this way, the node can accurately request the required UL resources. However, in the UL scheduling method shown in FIG. 8, the delay would be inevitable because the scheduling can only be done in serial manner. The latency between the UE and the IAB donor (end-to-end) may increase as the number of hops increases, if the IAB node schedules its child node only after being scheduled by its parent node, i.e., cascade scheduling. In the IAB scenarios, hop agnostic performance is one important thing that needs to be guaranteed, implying that IAB scheduling should meet the QoS requirement, e.g., in terms of latency, regardless of how far the UE is away from the IAB donor. The cascade scheduling cannot fulfil the required performance.

Figure 9:
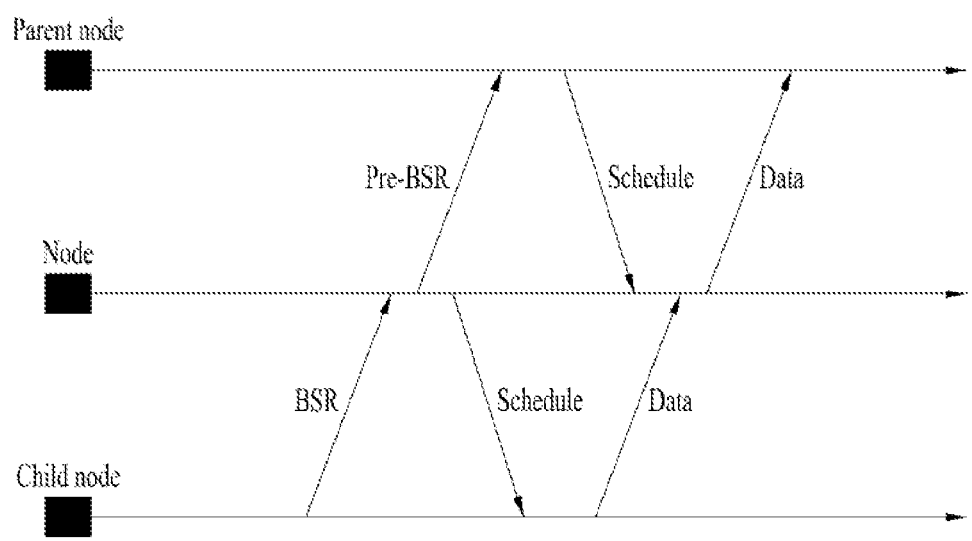
FIG. 9 illustrates another example of UL scheduling in IAB scenarios.

FIG. 9 illustrates another example of UL scheduling in IAB scenarios.

Alternative way of UL scheduling in IAB, which can reduce the total latency between the UE and the IAB-donor would be that, a node requests UL resource to its parent node prior to the reception of UL data from its child node, i.e., pre-BSR. For example, the node can trigger a pre-BSR when receiving a BSR from its child node. It may be possible because the node can estimate the amount of UL data that the node will receive based on the received BSR from its child node. This method would be good from latency perspective because the node can be scheduled earlier by its parent node than the method of FIG. 8 and use the scheduled UL resource as soon as the node receives UL data from its child node.

However, the pre-BSR based on the received BSR is not accurate and hence may result in waste of UL resources. For example, the node may decide to provide first UL resources only to accommodate a part among the reported amount of data. In this case, a pre-BSR, which simply forwards a whole amount of data reported by the child node, may lead to allocation of UL resources which is more than needed.

It would be more accurate to trigger a pre-BSR based on the actual UL scheduling by the node. For example, the node can trigger a pre-BSR when the node schedules the child node. In this case, a node of the present disclosure performs a buffer status reporting by considering the actual UL resources scheduled/allocated to the child node (i.e. actual UL data scheduled by the node for transmission). For example, the buffer size reported by a node to its parent node is determined considering the actual UL resources scheduled to the child node. In other words, when performing a buffer status reporting to a parent node based on UL data that an IAB node expects to receive from child node(s), the IAB node only consider UL data actually scheduled by the IAB node among the UL data expected to be received from child node(s) and does not consider UL data not yet scheduled by the IAB node among the UL data expected to be received from child node(s). The buffer status reported by the IAB node to the parent node may include an amount of UL data at child node(s) that is actually scheduled by the IAB node (and/or an amount of UL data available for transmission at the IAB node) and may not include an amount of UL data at child node(s) that is not yet scheduled by the IAB node.

In the present disclosure, a node can act as a child node to its parent node or a parent node to its child node. The node can be either a relay node (IAB node) or a UE. The child node refers to a scheduled node and the parent node refers to a scheduling node. For example, the child node may request an UL resource to its parent node. The child node may request an UL resource through a random access procedure, a scheduling request, or a buffer status reporting. The parent node may allocate, to its child node, an UL resource to be used for transmission of UL data from the child node to the parent node.

In the present disclosure, anode transmits, to a parent node, a BSR MAC CE including buffer status according to the present disclosure. The buffer status may include a buffer size related to a total amount of UL resources scheduled by the node for transmission of data from a child node to the node, or a buffer size representing or including an amount of UL data for which UL resources are allocated/scheduled to the child node. For example, when a node transmits a BSR MAC CE to a parent node, a buffer size in the BSR MAC CE may implicitly or explicitly indicate/represent a total amount of UL resources scheduled by the node for transmission of data from a child node to the node (or a total amount of UL data scheduled by the node for transmission from the child node(s) to the node). The total amount of UL resources scheduled by the node (or the total amount of UL data scheduled by the node) may mean:
- the amount of UL resources that is to be allocated to one or more child node(s); or
- the amount of UL resources that has been allocated to one or more child node(s); or
- the amount of UL data that is expected to be received from one or more child node(s); or
- a part of buffer size that is reported from one or more child node(s); or
- the amount of UL resources that is to be allocated to one or more child node(s) plus the amount of UL data that are available in L2 buffer (e.g., RLC and/or PDCP) of the node; or
- the amount of UL resources that has been allocated to one or more child node(s), where the UL resources are not yet used for transmission by the child node; or
- the amount of UL resources that has been allocated to one or more child node(s), where the UL resources are not yet used for transmission by the child node(s), plus the amount of UL data that are available in L2 buffer (e.g., RLC and/or PDCP) of the node.

The buffer status or buffer size in a BSR reported by the node does not reflect or include an amount of UL resources (or an amount of UL data) not yet scheduled/allocated by the node for child node(s).

In order to consider the total amount of UL resources scheduled by the node for one or multiple child nodes, the node may collect/aggregate the amount of UL resources scheduled by the node for each child node for a certain time duration. For example, the node may collect/aggregate the amount of UL data scheduled by the node for transmission from each child node in order to provide a parent node with a BSR that reflects the total amount of UL data scheduled by the node for transmission from one or more multiple child nodes. The certain time duration may be configured by the network (e.g., parent node or IAB donor). The certain time duration may start at a certain point in a time domain, and the certain time point (e.g., subframe index, slot index, etc) may be indicated by the network. Alternatively, the start of the certain time duration is up to the node implementation.

The node may trigger a BSR when the node is aware of the total amount of UL resources scheduled by the node. The node may trigger a BSR when the node is aware of the total amount of UL data of child node(s) that is scheduled by the node for transmission. For example, the node may trigger a BSR when the node receives buffer size information (e.g., BSR MAC CE) from one or more child node(s). For another example, the node may trigger a BSR when the node transmits scheduling information to one or more child node(s). For still another example, the node may trigger a BSR when the node decides the amount of UL resources to be scheduled to one or more child node(s) (or when the node decides the amount of UL data for which UL resources are allocated to one or more child nodes). The node may cancel the BSR MAC CE when the node transmits a MAC PDU including the BSR to the parent node.

When the parent node receives the BSR MAC CE from the node, the parent node will provide an UL grant to the node for transmission of data from the node to the parent node. When the node receives the UL grant from the parent node, the node generates a MAC PDU to be transmitted on the UL grant by including the UL data received from one or more child nodes.

Figure 10:
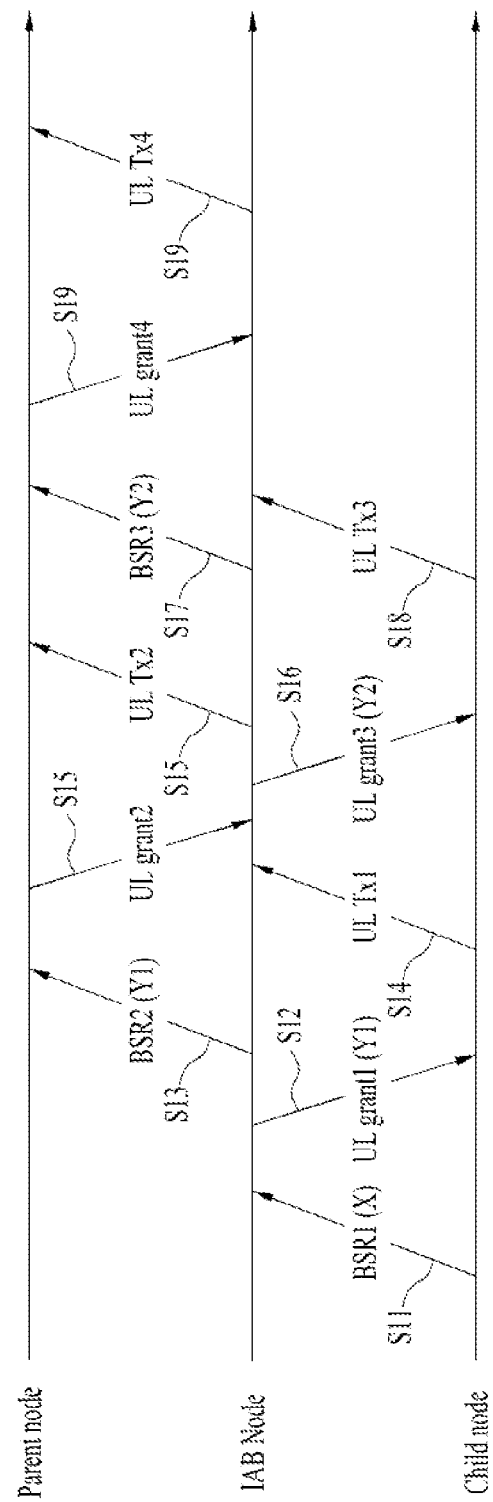
FIG. 10 illustrates an example of UL scheduling according to an implementation of the present disclosure.

FIG. 10 illustrates an example of UL scheduling according to an implementation of the present disclosure. In the example of FIG. 10, an IAB node is associated with its parent node and a child node.
- S11: the child node transmits a BSR1 to the IAB node, where the buffer size in the BSR1 is set to X.
- S12: The IAB node decides/determines an amount of UL resources allocated to the child node. For example, the IAB node may decide/determine a UL grant for allocating the UL resources to the child node. The IAB node may provide the child node with a UL grant1 that is not large enough to accommodate all data indicated by the BSR1. In other words, the IAB node may allocate an amount of UL resources that is not sufficient to accommodate all the amount of data indicated by the BSR1. For example, the size Y1 of UL grant1 shown in FIG. 10 may be less than X. The IAB node transmits the UL grant1 to the child node.

S13: The IAB node transmits a BSR2 to the parent node, where the buffer size in the BSR2 is set to Y1 which is different from X but the same as the amount of UL resources determined by the IAB node at S12. Although the BSR1 from the child node informs the IAB node of the amount of UL data for transmission at the child node is X, the IAB node provides the parent node with information about UL data volume excluding 'X minus Y1' as the UL transmission for the size/amount 'X minus Y1' of UL data at the child node is not yet scheduled by the IAB.

S14: The child node transmits UL data to the IAB node (UL TX1). The IAB node may receive the UL data from the child node based on the UL grant1.

S15: The IAB node receives an UL grant2 from the parent node, and transmits UL data to the parent node (UL TX2). The IAB node may transmit UL data to the parent node based on the UL grant2.

S16: The IAB node may decide/determine another amount of UL resources allocated to the child node. In the example of FIG. 10, the size of an UL grant3 for allocating the UL resources to the child node is Y2, which is less than X. The IAB node transmits an UL grant3 to the child node.

S17: The IAB node transmits a BSR3 to the parent node, where the buffer size in the BSR3 is set to Y2, which is different from X but the same as the determined amount of UL resources in S16.

S18: The child node transmits UL data to the IAB node (UL TX3). The IAB node receives the UL data from the child node based on the UL grant3.

S19: The IAB node receives an UL grant4 from the parent node, and transmits UL data to the parent node (UL TX4). The IAB node may transmit UL data to the parent node based on the UL grant4.

Figure 11:
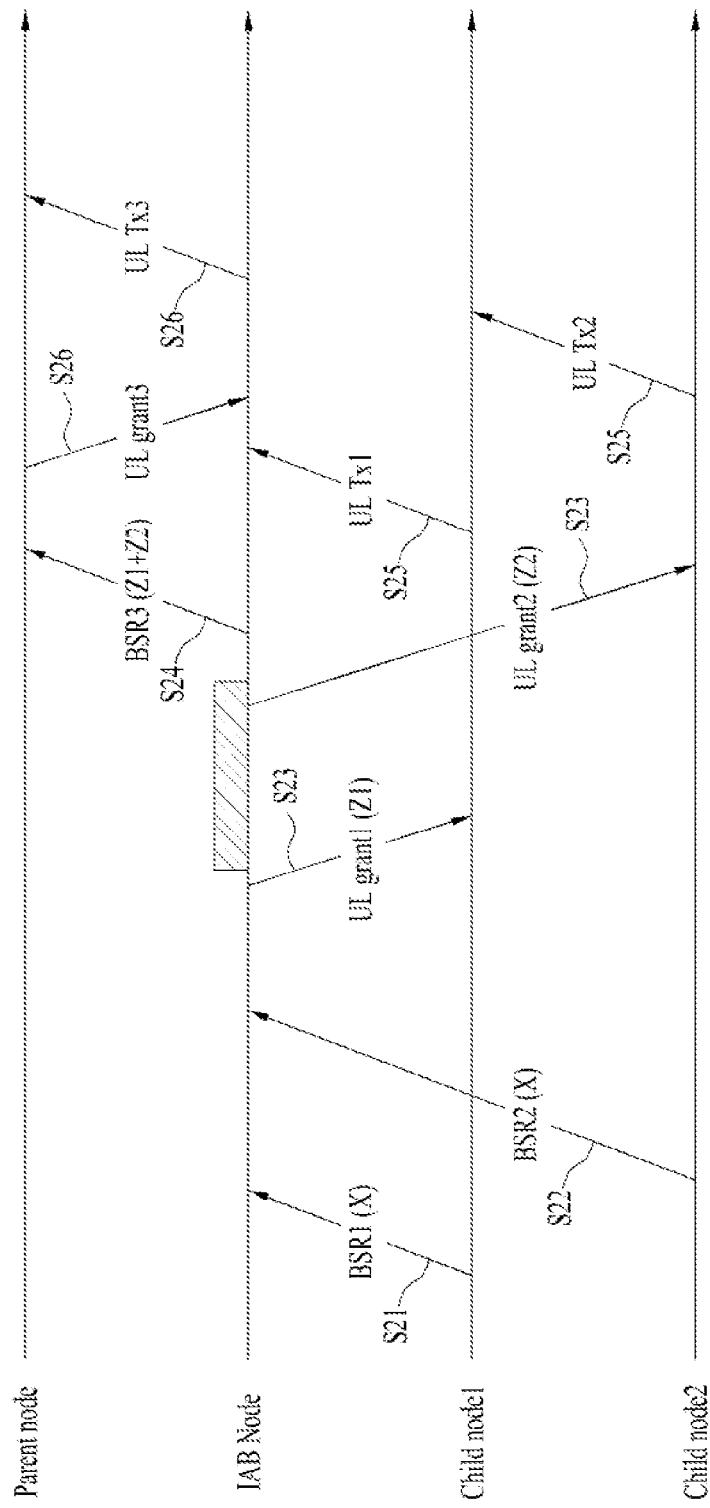
FIG. 11 illustrates an example of UL scheduling according to an implementation of the present disclosure.

FIG. 11 illustrates another example of UL scheduling according to an implementation of the present disclosure. In the example of FIG. 10, an IAB node is associated with its parent node and two child nodes (child node 1 and child node 2).

S21. The child node 1 transmits a BSR1 to the IAB node, where the buffer size in the BSR1 is set to X.

S22. The child node 2 transmits a BSR2 to the IAB node, where the buffer size in the BSR2 is set to Y.

S23. The IAB node decides or determines an amount of UL resources allocated to the child nodes, where the size of a UL grant1 for allocating UL resources to the child node 1 and the size of a UL grant2 for allocating UL resources to child node 2 are Z1 and Z2, respectively. Z1 may be less than X and Z2 may be less than Y.

S24. The IAB node transmits a BSR3 to the parent node, where the buffer size in the BSR3 is set to Z1 plus Z2, which is different from X+Y but the same as the determined total amount of UL resources in S23. The IAB node may decide to consider UL grant1 and UL grant2 when reporting the BSR3, because they are within a certain time duration.

S25. The child node 1 and the child node 2 transmit their UL data to the IAB node (UL TX1, UL TX2). The child node 1 transmits its UL data based on the UL grant1, and the child node 2 transmits its UL data based on UL grant2. The IAB node receives the UL data of the child node 1 based on the UL grant1 and receives the UL data of the child node 2 based on the UL grant2.

S26. The IAB node receives an UL grant3 from the parent node, and transmits UL data to the parent node (UL TX3). The IAB node transmits its UL data to the parent node based on the UL grant3.

Figure 12:
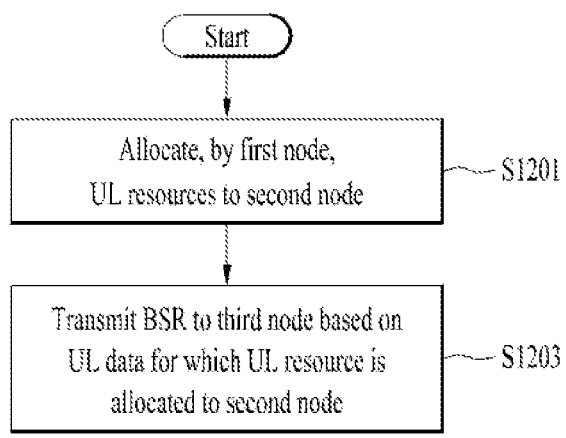
FIG. 12 illustrates an example of a flow diagram for UL transmission according to an implementation of the present disclosure.

FIG. 12 illustrates an example of a flow diagram for UL transmission according to an implementation of the present disclosure.

An IAB node (first node) may transmit a BSR (pre-BSR) to a parent node (third node) based on UL data expected to receive from its child node(s) (second node). When transmitting the pre-BSR, the first node of the present disclosure considers an amount UL resources allocated by the first node to the second node (i.e. an amount of UL data of the second node for which UL resources are allocated to the second node by the first node).

Referring to FIG. 12, the first node may schedule UL data transmission of the second node (i.e. allocate UL resources to UL data of the second node) (S1201) based on BSR(s) from the second node. The first node may determine a buffer size to be included in the pre-BSR, not based on the whole amount of UL data expected to receive from its child node(s), but based on an amount of UL data of the second node that is actually scheduled for the child node(s) by the first node among the whole amount of UL data expected to receive from the child node(s). The first node may transmit the pre-BSR including the determined buffer size to the third node (S1203). The buffer size or buffer status included in the pre-BSR may further include or reflect an amount of UL data available for transmission at the first node. The buffer size or buffer status included in the pre-BSR does not include or reflect an amount of UL data which is not yet scheduled by the first node for the child node(s) among the whole amount of UL data expected to be received from the child node(s).

When considering an amount of UL data that is actually scheduled by the first node for child node(s) in order to determine a buffer size/status for a pre-BSR, the first node may consider UL resource(s)/grant(s) only scheduled for a certain time duration. An amount of data corresponding to the UL resource(s)/grant(s) scheduled outside the time duration may not be included in a buffer size/buffer status for the pre-BSR.

In the present invention, the pre-BSR of an IAB node does not merely forward a whole amount of data reported by child node(s) to a parent node, but inform the parent node of an amount of data that includes UL data of the child node actually scheduled by the IAB node and does not include UL data of the child node not yet scheduled by the IAB node). Accordingly, according to the implementations of the present disclosure, the pre-BSR may be performed more accurately.

As described above, the detailed description of the preferred implementations of the present disclosure has been given to enable those skilled in the art to implement and practice the disclosure. Although the disclosure has been described with reference to exemplary implementations, those skilled in the art will appreciate that various modifications and variations can be made in the present disclosure without departing from the spirit or scope of the disclosure described in the appended claims. Accordingly, the disclosure should not be limited to the specific implementations described herein, but should be accorded the broadest scope consistent with the principles and novel features disclosed herein.

INDUSTRIAL APPLICABILITY

The implementations of the present disclosure are applicable to a network node (e.g., BS), a UE, or other devices in a wireless communication system.

The invention claimed is:

1. A method for performing buffer status reporting (BSR) by a first node in a wireless communication system, the method comprising:
    triggering a pre-BSR; and
    transmitting a buffer status report to a parent node of the first node based on the triggered pre-BSR,
    wherein triggering the pre-BSR comprises:
        triggering the pre-BSR based on providing scheduling information to a child node of the first node,
    wherein the first node is an integrated access and backhaul (IAB) node, the child node of the first node is an IAB node or UE for which transmission is scheduled by the first node, and the parent node of the first node is an IAB node that schedules transmission for the first node, and
    wherein the buffer status report includes information regarding a total amount of data that is determined based on buffer sizes received from child nodes of the first node for a time duration configured by the parent node starting from a time point indicated by the parent node.

2. The method according to claim 1, further comprising:
    receiving, from the child node of the first node, a buffer status report including information regarding an amount of data available for transmission at the child node of the first node,
    wherein triggering the pre-BSR further comprises:
        triggering the pre-BSR based on receiving the buffer status report including the information regarding the amount of data available for transmission at the child node of the first node.

3. A device for a first node of performing buffer status reporting (BSR) in a wireless communication system, the device comprising:
    at least one processor; and
    at least one computer memory that is operably connectable to the at least one processor and that has stored thereon instructions which, when executed, cause the at least one processor to perform operations comprising:
    triggering a pre-BSR; and
    transmitting a buffer status report to a parent node of the first node based on the triggered pre-BSR,
    wherein triggering the pre-BSR comprises:
        triggering the pre-BSR based on providing scheduling information to a child node of the first node,
    wherein the first node is an integrated access and backhaul (IAB) node, the child node of the first node is an TAB node or UE for which transmission is scheduled by the first node, and the parent node of the first node is an TAB node that schedules transmission for the first node, and
    wherein the buffer status report includes information regarding a total amount of data that is determined based on buffer sizes received from child nodes of the first node for a time duration configured by the parent node starting from a time point indicated by the parent node.

4. The device according to claim 3,
    wherein the operations further comprise:
    receiving, from the child node of the first node, a buffer status report including information regarding an amount of data available for transmission at the child node of the first node,
    wherein triggering the pre-BSR further comprises:
        triggering the pre-BSR based on receiving the buffer status report including the information regarding the amount of data available for transmission at the child node of the first node.

5. A non-transitory computer readable storage medium embodied on a computer readable medium, comprising at least one program code that causes at least one processor to perform operations comprising:
    triggering, at a first node, a pre-buffer status reporting (BSR); and
    transmitting a buffer status report to a parent node of the first node based on the triggered pre-BSR,
    wherein triggering the pre-BSR comprises:
        triggering the pre-BSR based on providing scheduling information to a child node of the first node,
    wherein the first node is an integrated access and backhaul (IAB) node, the child node of the first node is an IAB node or UE for which transmission is scheduled by the first node, and the parent node of the first node is an IAB node that schedules transmission for the first node, and
    wherein the buffer status report includes information regarding a total amount of uplink (UL) data that is determined based on buffer sizes received from child nodes of the first node for a time duration configured by the parent node starting from a time point indicated by the parent node.

6. The non-transitory computer readable storage medium according to claim 5,
    wherein the operations further comprise:
    receiving, from the child node of the first node, a buffer status report including information regarding an amount of data available for transmission at the child node of the first node,
    wherein triggering the pre-BSR further comprises:
        triggering the pre-BSR based on receiving the buffer status report including the information regarding the amount of data available for transmission at the child node of the first node.

* * * * *